Patented Apr. 21, 1936

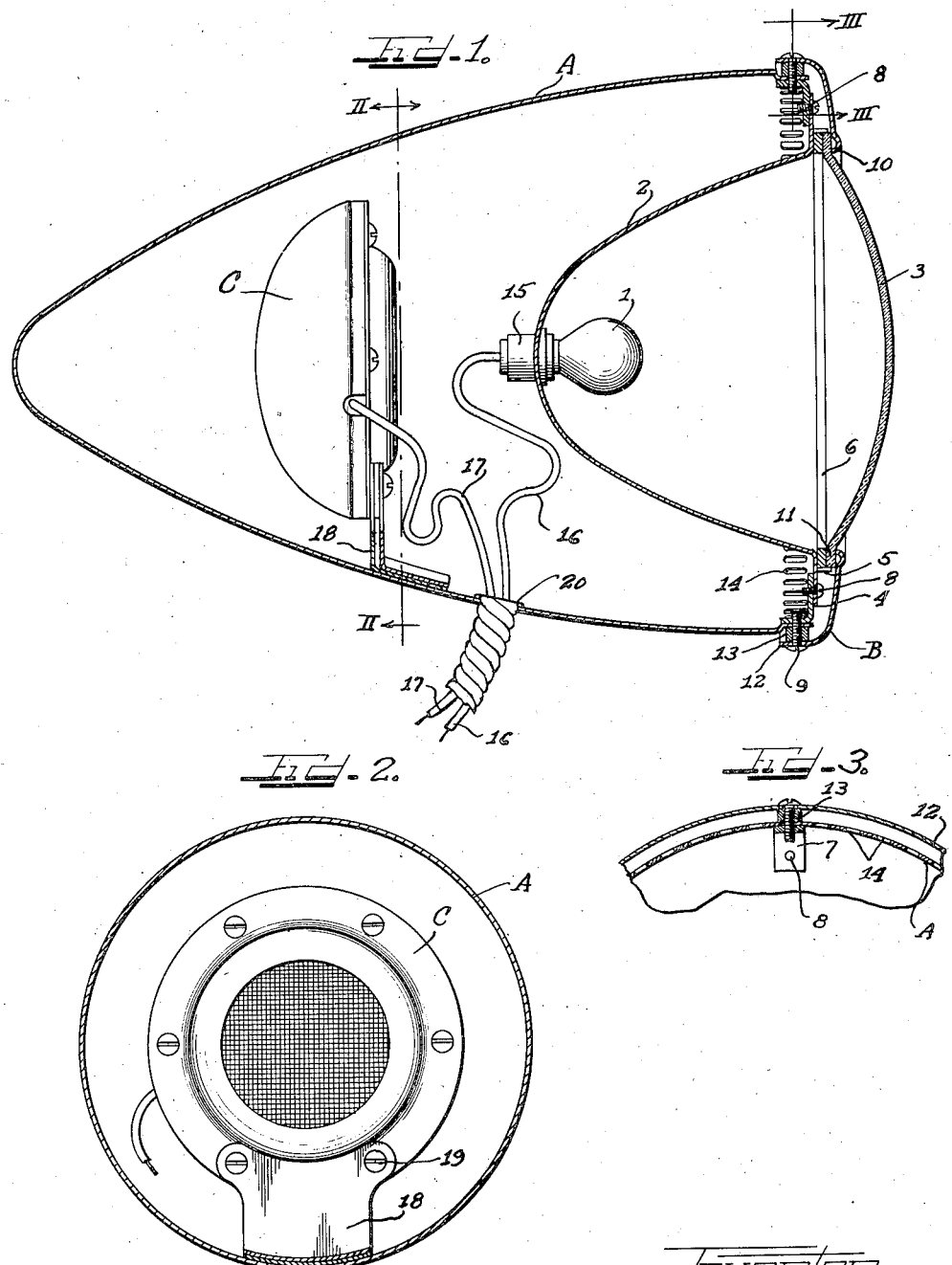

2,037,826

UNITED STATES PATENT OFFICE 2,037,826

HEADLIGHT AND HORN CONSTRUCTION

Ray A. Sandberg, North Chicago, Ill., assignor to Oakes Products Corporation, North Chicago, Ill., a corporation of Michigan Application May 20, 1935, Serial No. 22,427

1 Claim. (Cl. 177—7)

The present invention relates to a novel headlight and horn construction for automotive vehicles.

Automotive vehicles, particularly of the pleasure type are, at the present time, streamlined more or less and have certain accessories, such as lamp casings and the like, correspondingly streamlined to harmonize in design and appearance with the vehicles.

Many pleasure cars are finished with certain accessories chromium plated or otherwise finished, which plating, when applied to horns, proves expensive.

The construction of the electric horns in use at the present time is such that these horns are small and compact and do not lend themselves very readily to streamlining or to chromium plating without undue expense of manufacture.

Experience has proved that signal horns for automotive vehicles should be placed outside of the hoods of the vehicles, preferably at the fronts of the vehicles for projecting warning signals ahead of the vehicles without unnecessarily muffling these sounds. Installations of the horns outside of the vehicle hoods is disadvantageous in that rain, sleet, ice and snow and dirt enter the horns, requiring frequent attention and adjustment, and in many instances requiring replacement.

In the streamline designs of present day motor vehicles, the lamp casings are longer than necessary to accommodate the lamp structures. The present invention takes advantage of this fact and installs the horns in such casings and uses the casings for sound amplification.

The installation of the horns in the lamp casings makes possible the mounting of the horns at the fronts of the vehicles, out of sight, thereby eliminating the need for special designs or finishes of the horns, so that any ordinary stock horns may be utilized in the finest of cars.

An object of the present invention is to provide a combined headlight and horn construction for automotive vehicles wherein the headlight casing is streamlined substantially parabolic in axial section, with a horn mounted within the casing substantially at the focus thereof, and wherein the casing is utilized as the trumpet or amplifier for the horn.

Another object of the present invention is to provide a combination headlight and horn construction wherein horns are mounted within the headlight casings, and the casings utilized to amplify the horn signals.

A further object of the present invention is to provide a headlight and horn construction wherein a horn may be mounted in a headlight casing and thus at the front of a vehicle, which horn is thereby concealed from view and protected from the elements, thereby enabling use of any type of horn in the finest of cars, without special finish or design of the horn.

A still further object of the present invention is to provide a streamlined headlight and horn construction for automotive vehicles.

Generally speaking, the invention contemplates a streamlined lamp casing with a headlight mounted in the open end of the casing, a horn without a trumpet or amplifier mounted within the casing substantially at the focus thereof and with the casing provided with sound emission apertures which are protected from the weather.

An embodiment of the present invention is illustrated in the accompanying drawing, and the views thereof are as follows:

Figure 1 is an axial vertical section through a headlight and horn construction embodying principles of the present invention, showing the horn and light source in elevation, and other parts in section.

Figure 2 is a vertical sectional view taken substantially in the plane indicated by line II—II of Figure 1 and, Figure 3 is a fragmental vertical sectional view taken substantially in the plane indicated by line III—III of Figure 1.

The drawing will now be explained:

The construction of the present invention contemplates a lamp casing A which is preferably made as parabolic in axial section for streamlining. A headlight consisting of a light source 1 and a reflector 2, with a lens 3 is mounted in the open end of the casing A. As illustrated the margin of the reflector 2 is formed with an annular flange 4 substantially perpendicular to the axis of the reflector. The flange 4 has lugs 5 struck out from it serving to support the lens 3 in front of the reflector. A suitable gasket 6 is interposed between the margins of the lens 3 and the flange 4 of the reflector to absorb vibration and prevent breakage of the lens.

The headlight is mounted in the open end of the casing A by means of a plurality of brackets 7 which are fastened to the flange 4 by screws 8 and to the margin of the open end of the casing A by screws 9.

For supporting the lens 3 in front of the reflector 2 a bezel B is utilized. The bezel has an inner margin 10 for contacting the flange portion 11 of the lens to maintain the lens pressed against the gasket 6 in closing relation, and has a rearwardly extending flange portion 12 which surrounds the margin of the casing adjacent its open end, in spaced relation. The bezel B is secured to the casing A by the screws 9 which enter through suitable apertures in the flange 12 of the bezel and pass through spacers 13 for mounting the bezel on the casing with the bezel flange 12 spaced from the casing. For providing sound emission openings in the casing A, preferably a plurality of elongated slots 14 are made in the casing adjacent its open end and underlying the rearwardly extending flange 12 of the bezel B. The construction of the slots 14 and the flange 12 of the bezel is such that the flange serves as a weather guard for the slots, preventing entry of rain, sleet, snow and dirt into the interior of the casing A.

The light source 1 is positioned in a suitable socket 15 mounted in the reflector 2 and is energized by electric current through a conductor 16 from a battery and a ground connection to the light source.

Disposed substantially at the focus of the parabolic casing A is a sound creating means C, herein shown as a vibration type of electric horn.

For the purposes of description the term "horn" is herein used generically to designate any well known sound creating apparatus for automotive vehicles, and the term "trumpet" is used as designating the amplifier for the sound created by the sound creating apparatus. Therefore, the use of the term "horn" herein will not include the usual trumpet or amplifier with which such devices are usually equipped as part of the horn structure, so called.

The horn B is of the vibration type, preferably, although it may be of the motor type and is energized by electrical current supplied to it through a conductor 17 from a battery and a control switch, such as a horn button on the steering wheel of the vehicle. The horn C is removably supported within the casing A by means of a bracket structure 18 welded or otherwise secured to the interior of the casing A at a suitable position, and by screws 19 fastening the horn to the bracket.

The formation of the casing A as a parabola enables use of the casing as an amplifier or trumpet for the horn C to intensify the sound created by such horn.

Where there has herein been illustrated and described but one headlight and horn construction, it is of course understood that the invention contemplates two such headlight casings and horns mounted at the front of an automotive vehicle on each side of the center line of the same, as is common practice. The casing A is mounted on a vehicle by any suitable bracket or attaching means, not shown, as the same forms no part of the present invention.

The casing A is suitably apertured at 20 to receive the conductors 16 and 17 for the headlight and horn respectively.

It will be observed that the construction of the present invention provides a streamlined lamp casing wherein a headlight and horn are supported thereby enabling streamlining of the headlight and without having to streamline the horn and without having to finish or design the horn in any particular or suitable manner, thereby reducing the cost of the horns for such vehicles.

Figures 1 and 3 illustrate the relationship of the apertures 14 in the casing A and the flange 12 of the bezel B, with the flange protecting the apertures as a weatherguard.

Utilization of the parabolic casing A as a trumpet or amplifier for the sound created by the horn C intensifies the sound audible outside of the casing, to an extent that such sound is not muffled or dampened by reason of the installation of the horn within the casing A.

The invention has herein been described more or less precisely as to details, yet it is to be understood that the invention is not to be limited thereby as changes may be made in the arrangement and proportion of parts, and equivalents may be substituted without departing from the spirit and scope of the invention.

The invention is claimed as follows:

In a device of the class described, a lamp casing of the headlight type, a headlight within said casing, a sound producer within said casing, a lens for said headlight, a bezel for securing said lens in position in said lens, said bezel having a rearwardly directed flange surrounding said casing adjacent said open end and in outwardly spaced relation to said casing, means securing said bezel to said casing, and said casing being provided with a series of apertures therein immediately behind the open end thereof and underlying said bezel flange, said bezel flange serving as a guard to prevent entry of foreign matter into said casing through said apertures.

RAY A. SANDBERG.